US008522091B1

(12) United States Patent
White et al.

(10) Patent No.: US 8,522,091 B1
(45) Date of Patent: Aug. 27, 2013

(54) PRIORITIZED DETECTION OF MEMORY CORRUPTION

(75) Inventors: Dagan M. White, Cupertino, CA (US); John D. Corbett, Monte Sereno, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/300,507

(22) Filed: Nov. 18, 2011

(51) Int. Cl.
*G01R 31/28* (2006.01)

(52) U.S. Cl.
USPC .......................................................... 714/725

(58) Field of Classification Search
USPC .......................................................... 714/725
See application file for complete search history.

(56) References Cited

U.S. PATENT DOCUMENTS

| | | | |
|---|---|---|---|
| 6,526,559 B2 | 2/2003 | Schiefele et al. | |
| 6,624,654 B1 | 9/2003 | Trimberger | |
| 7,036,059 B1 | 4/2006 | Carmichael et al. | |
| 7,111,224 B1 | 9/2006 | Trimberger | |
| 7,143,329 B1 * | 11/2006 | Trimberger et al. | 714/746 |
| 7,212,448 B1 | 5/2007 | Trimberger | |
| 7,343,578 B1 * | 3/2008 | Patterson et al. | 716/117 |
| 7,406,573 B2 * | 7/2008 | Huppenthal et al. | 711/154 |
| 7,406,673 B1 | 7/2008 | Patterson et al. | |
| 7,576,557 B1 | 8/2009 | Tseng et al. | |
| 7,852,107 B1 * | 12/2010 | Sundararajan | 326/10 |
| 8,146,028 B1 * | 3/2012 | Lesea | 716/104 |
| 2005/0071572 A1 * | 3/2005 | Nakashima et al. | 711/137 |
| 2006/0036909 A1 | 2/2006 | VanBuren | |
| 2006/0107127 A1 | 5/2006 | Park et al. | |
| 2008/0189481 A1 * | 8/2008 | Mayer et al. | 711/111 |
| 2009/0006720 A1 * | 1/2009 | Traister | 711/103 |
| 2010/0202203 A1 * | 8/2010 | Choi et al. | 365/185.09 |
| 2010/0241900 A1 * | 9/2010 | Check et al. | 714/15 |
| 2012/0238283 A1 * | 9/2012 | Tian et al. | 455/452.1 |

FOREIGN PATENT DOCUMENTS

WO    WO 2007/103590 A2    9/2007

OTHER PUBLICATIONS

Investigation of multi-bit upsets in a 150nm technology sram device, Nuclear Science, IEEE Transactions on Date of Publication: Dec. 2005, Author(s): Radaelli, D., Skip Wong; Daniel, S.; vol. 52 , Issue: 6; pp. 2433-2437.*
U.S. Appl. No. 12/274,261, filed Nov. 19, 2008, Lesea, Austin, Xilinx, Inc. 2100 Logic Drive, San Jose, CA USA.
U.S. Appl. No. 12/950,171, filed Nov. 19, 2010, Rodriguez, Alfred L., et al., Xilinx, Inc. 2100 Logic Drive, San Jose, CA USA.
Brinkley, Phil et al., *SEU Mitigation Design Techniques for the XQR4000XL*, XAPP181 (v1.0), Mar. 15, 2000, pp. 1-14, Xilinx, Inc., San Jose, California, USA.

(Continued)

*Primary Examiner* — Ajay Bhatia
*Assistant Examiner* — Thien D Nguyen
(74) *Attorney, Agent, or Firm* — LeRoy D. Maunu

(57) ABSTRACT

In one embodiment, a method of detecting corruption of configuration memory is provided. A bitstream of a circuit design that includes at least a first module and a second module is generated. Configuration memory cells used to implement each of the first and second modules are determined. The configuration memory cells are programmed with the bitstream. After programming, configuration memory cells used to implement the first module are checked for corruption at a first frequency, and configuration memory cells used to implement the second module are checked for corruption at a second frequency, with the first frequency being different from the second frequency.

20 Claims, 7 Drawing Sheets

(56) References Cited

OTHER PUBLICATIONS

Gusmao De Lima Kastensmidt, Fernanda et al., Designing Fault Tolerant Techniques for SRAM-Based FPGAs, *IEEE Design & Test of Computers*, Nov. 2004, pp. 552-562, vol. 21, Issue 6, IEEE Computer Society Press, Los Alamitos, California, USA.

Lima, Fernanda et al., "Designing Fault Tolerant Systems into SRAM-based FPGAs," *Proc. of the 40th Design Automation Conference (DAC'03)* Jun. 2, 2003, pp. 650-655, ACM, New York, New York, USA.

Xilinx, Inc., LogiCORE™ IP Soft Error Mitigation Controller, User Guide, UG764 (v1.1), Sep. 21, 2010, pp. 1-90, Xilinx, Inc. 2100 Logic Drive, San Jose, CA USA.

Xilinx, Inc., LogiCORE™ IP Soft Error Mitigation Controller, User Guide, UG764 (v1.2), Dec. 14, 2010, pp. 1-96, Xilinx, Inc. 2100 Logic Drive, San Jose, CA USA.

Xilinx, Inc., LogiCORE™ IP Soft Error Mitigation Controller, User Guide, UG764 (v1.3), Mar. 1, 2011, pp. 1-94, Xilinx, Inc. 2100 Logic Drive, San Jose, CA USA.

Xilinx, Inc., LogiCORE™ IP Soft Error Mitigation Controller, User Guide, UG764 (v2.1), Jun. 22, 2011, pp. 1-100, Xilinx, Inc. 2100 Logic Drive, San Jose, CA USA.

Xilinx, Inc., LogiCORE™ IP Soft Error Mitigation Controller, User Guide, UG764 (v3.1), Oct. 19, 2011, pp. 1-104, Xilinx, Inc. 2100 Logic Drive, San Jose, CA USA.

Xilinx, Inc., Partial Reconfiguration, User Guide, UG702 (v12.1), May 3, 2010, pp. 1-126, Xilinx, Inc. 2100 Logic Drive, San Jose, CA USA.

Xilinx, Inc., Partial Reconfiguration, User Guide, UG702 (v12.3), Oct. 5, 2010, pp. 1-130, Xilinx, Inc. 2100 Logic Drive, San Jose, CA USA.

\* cited by examiner

PRIORITIZED DETECTION OF MEMORY CORRUPTION

FIELD OF THE INVENTION

One or more embodiments generally relate to providing fault tolerance in systems that are susceptible to corruption of memory cells.

BACKGROUND

Programmable integrated circuits (ICs) are ICs that are user configurable and capable of implementing digital logic operations. There are several types of programmable ICs, including complex programmable logic devices (CPLDs) and field programmable gate arrays (FPGAs). CPLDs typically include several function blocks that are based on the well-known programmable logic array (PLA) architecture with sum-of-products logic, and include a central interconnect matrix to transmit signals between the function blocks. Signals are transmitted into and out of the interconnect matrix through input/output blocks (IOBs). The input/output function of the IOBs, the logic performed by the function blocks and the signal paths implemented by the interconnect matrix are all controlled by configuration data stored in configuration memory of the CPLD.

FPGAs include configurable logic blocks (CLBs) that are arranged in rows and columns, IOBs that surround the CLBs, and programmable interconnect lines that extend between the rows and columns of CLBs. Each CLB includes look-up tables and other configurable circuitry that are programmable to implement a portion of a larger logic function. The CLBs, IOBs and interconnect lines are configured by data stored in a configuration memory of the FPGA.

The reprogrammability of many programmable ICs makes them advantageous in many applications because it is possible to reconfigure programmable logic by loading new configuration data, as compared to application-specific integrated circuits (ASICs), which would require replacement. The versatility of reprogrammable ICs is advantageous in applications such as aerospace, where remote reconfiguration is preferred over physical replacement. However, many aerospace applications expose components to environments where radiation is present, which can cause single event upsets (SEUs) in configuration memory cells and result in the configured logic not operating as intended. In some instances, an SEU may have only a transient effect and may disappear.

Some previous techniques to mitigate the affect of SEUs involve the use of triple modular redundancy (TMR). In these techniques, three redundant copies of selected logic are implemented and operate in parallel. The output of each copy is analyzed to determine the correct value of the output. In addition to TMR, scrubbing may be employed to reconfigure the memory cells of the integrated circuit when corruption is detected. However, TMR is expensive as the circuit needs to be triplicated, which requires three times the circuit area of the single circuit.

Some other techniques to mitigate the effects of SEUs sequentially check all configuration memory cells in a continuous cycle for errors. In response to detecting an error, measures are taken to correct or mitigate the effect of the error. However, unless the corruption occurs in a memory frame immediately before that particular memory frame is checked for corruption, there will be a delay before corruption can be detected and mitigation measures can be employed.

The one or more embodiments may address one or more of the above issues.

SUMMARY

In one embodiment, a method of detecting corruption of configuration memory is provided. A bitstream of a circuit design that includes at least a first module and a second module is generated. Configuration memory cells used to implement each of the first and second modules are determined. The configuration memory cells are programmed with the bitstream. After programming, configuration memory cells used to implement the first module are checked for corruption at a first frequency, and configuration memory cells used to implement the second module are checked for corruption at a second frequency, with the first frequency being different from the second frequency.

In another embodiment, a circuit includes a plurality of memory cells configured to implement a plurality of modules of a circuit design; and a control circuit coupled to the plurality of memory cells and configured to: determine configuration memory cells used to implement each of first and second modules of the plurality of modules; check the configuration memory cells used to implement the first module for corruption at a first frequency; and check the configuration memory cells used to implement the second module for corruption at a second frequency, the first frequency being different from the second frequency.

In yet another embodiment, a method of mitigating corruption of configuration memory cells is provided. Configuration memory cells are programmed to implement one or more modules of a circuit design in first and second redundant instances. Configuration memory cells used to implement the first redundant instance of each of the one or more modules are determined. After programming the configuration memory cells for each of the one or more modules, configuration memory cells programmed with the first redundant instance are checked for corruption at a first frequency. For each module of the circuit design other than the one or more modules, configuration memory cells used to implement the module are checked for corruption at a second frequency. The first frequency is greater than the second frequency. Outputs of the first and second redundant instances of each of the one or more modules are compared. In response to discrepant outputs between the first and second redundant instances that implement a module of the one or more modules, it is determined whether the configuration memory cells programmed with the first redundant instance or the configuration memory cells programmed with the second redundant instance has a corrupted configuration memory cell. Output is selected from the one of the first and second redundant instances for which the programmed configuration memory cells do not include a corrupted configuration memory cell.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings in which:

FIGS. 2-1 and 2-2 illustrate groups of memory cells used in implementing modules of a circuit design and associated priorities for checking for corruption of those memory cells;

DETAILED DESCRIPTION OF THE DRAWINGS

Configuration memory may become corrupted due to SEU, signal noise, electrostatic discharge, etc., resulting in reconfigured logic that produces incorrect output. Some techniques to detect and mitigate the memory corruption sequentially check all memory locations in a continuous cycle for errors. In response to detecting an error, measures are taken to correct or mitigate the effect of the error. However, unless the corruption occurs immediately before that particular memory location is checked for corruption, there will be a delay before corruption can be detected and mitigation measures can be employed. While the embodiments may be used to detect/mitigate corruption of memory in a variety of applications, for ease of illustration and explanation, the embodiments and examples provided herein are primarily described with reference to corruption of configuration memory of programmable ICs.

In one or more embodiments, rather than check all configuration memory cells of a programmable IC at the same frequency, configuration memory cells of two or more different modules of a circuit design implemented with the programmable IC are checked for corruption at different frequencies. Critical modules of a circuit design may be assigned a high priority and checked for corruption more frequently than low priority modules. In this manner, the time needed to detect and isolate corruption of critical modules of a circuit design may be reduced. By checking critical modules more frequently, the window of vulnerability, in which that critical module can produce incorrect output before an error is detected, is reduced. In this manner, error propagation may be reduced.

Figure 1:
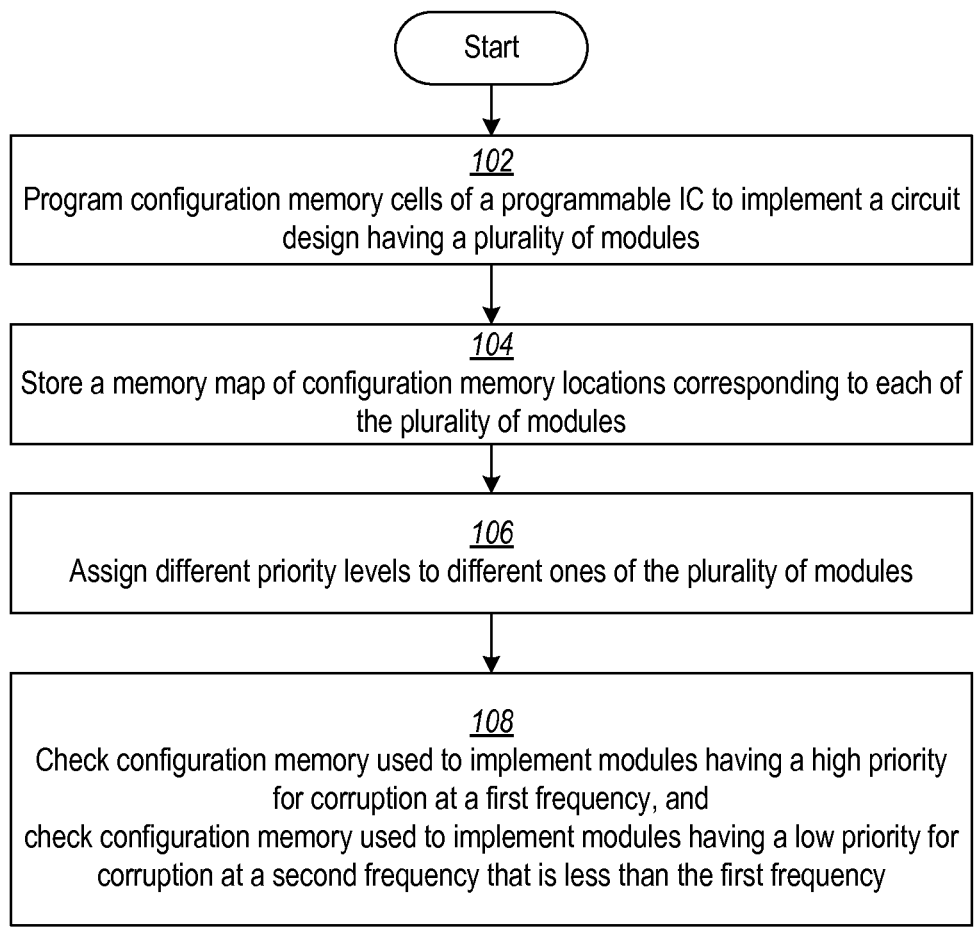
FIG. 1 shows a method for prioritized detection of corrupted memory cells of a programmable IC, in accordance with one or more embodiments.

FIG. 1 shows a flowchart of a method for performing prioritized corruption checking in accordance with one or more embodiments. Configuration memory cells of a programmable IC are programmed at block 102 to implement a circuit design having a plurality of modules. A memory map of configuration memory frames corresponding to each of the plurality of modules is stored at block 104. Different priority levels are assigned to different ones of the plurality of modules at block 106. During operation of the programmable IC, checking for corruption of configuration memory cells that implement the modules is performed according to the assigned priorities at block 108. Configuration memory cells used to implement modules having a high priority are checked for corruption a first frequency, and configuration memory cells used to implement modules having a low priority are checked for corruption at a second frequency that is less than the first frequency. That is, the configuration memory cells of the high priority modules are checked more frequently for corruption than are the configuration memory cells of the low priority modules.

The corruption may be detected at block 108 in a number of ways. In one implementation, corruption can be detected by continuously scanning frames of configuration cells of the device and computing a checksum or hash. If the computed checksum/hash of a scan differs from an expected checksum/hash, corruption is detected. In another implementation, an error correction code (ECC) value is embedded in each frame of configuration memory. As each frame is scanned, the ECC value is calculated and combined with the embedded ECC to expose any error. It is then possible to use this ECC to identify the address of a single bit error in the configuration memory frame. In yet another implementation, frames of configuration memory may be compared to a redundant copy of each frame to determine if corruption has occurred. Hardware used to check for corruption may be implemented in an ASIC or in programmable logic of the programmable IC or by an external device coupled to the programmable IC.

Various approaches may also be employed to generate the memory map that indicates which configuration memory cells implement each of the first and second copies of the circuit design. For example, U.S. Pat. No. 7,343,578 describes methods for determining a correlation between modules of a circuit design and portions of configuration memory used to implement each module.

Modules of a circuit design may be prioritized using different criteria. In some embodiments, priorities of modules may be determined based on a reliability analysis of the system. For example, in one or more embodiments, a probability of failure is determined for each module of the circuit design. Priority of the modules may be set according to the determined probability of failure. For example, if a portion of the circuit design is implemented with TMR, the modules implementing copies of the TMR portion could be assigned a low probability of failure because corruption would be detected and corrected by the TMR system. In another embodiment, priorities of modules may be based on the current state of the circuit. For example, if a module is currently inactive, it should have low priority until just prior to activation, at which point the module would have a very high priority for purposes of checking for corruption. Similarly, if a module is determined to be corrupt, it may be given a low priority for corruption detection until it has been repaired and re-activated. In yet another embodiment, priorities of modules may be based on activity levels of the modules with higher switching frequencies being assigned higher priorities than less active modules. The priority assigned to a module may be static or may be dynamically updated based on status of the modules during operation of the programmable IC.

It is recognized that different implementations may check for corruption in groups of bits having different numbers of bits. For example, one implementation may check for corruption on a byte-by-byte basis, and another implementation may check for corruption on a word-by-word basis. While embodiments are not so limited, for ease of explanation, the embodiments and examples are primarily described with reference to detection of corruption of configuration memory on a frame-by-frame basis.

Figures 1, 2:
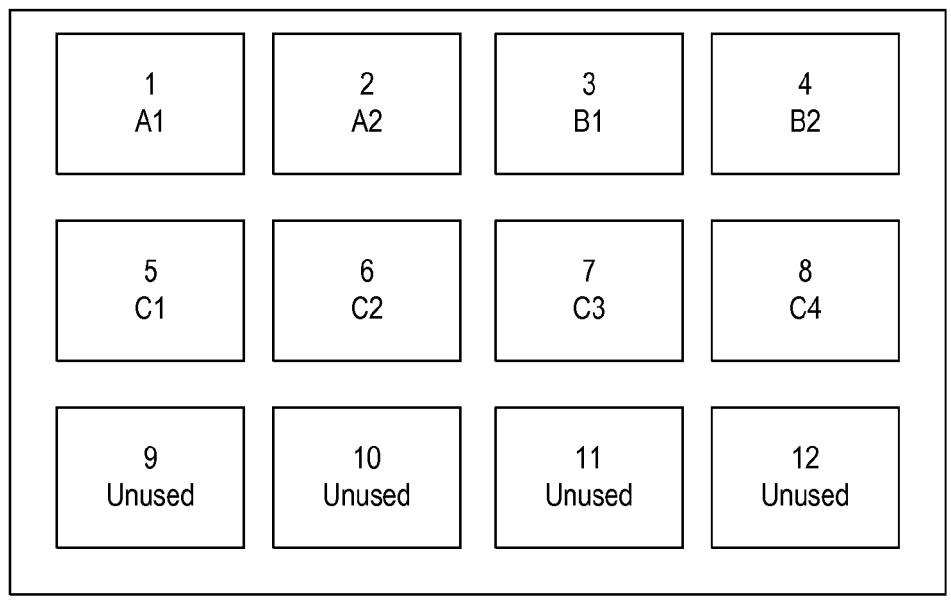
Figure 2:
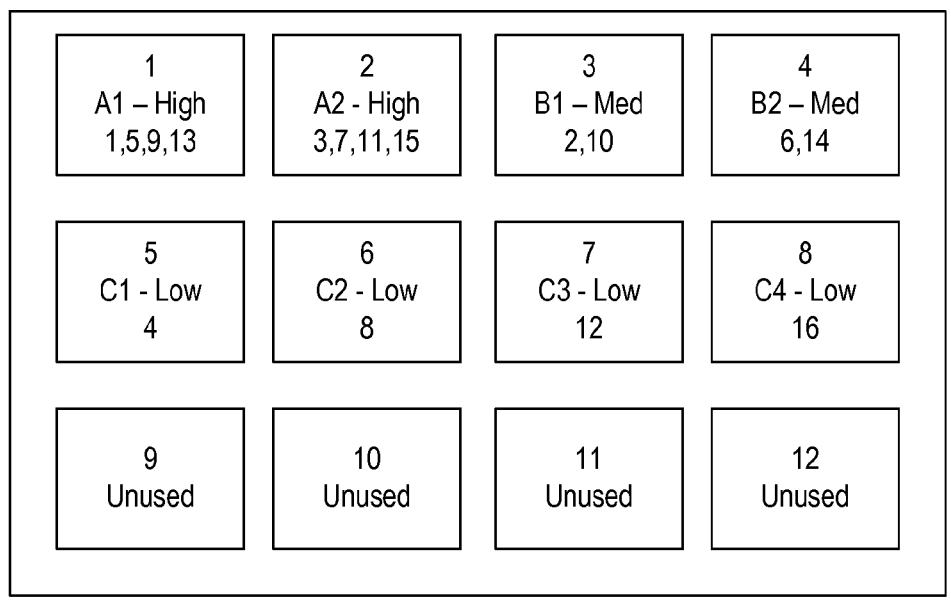

FIGS. 2-1 and 2-2 illustrate groups of memory cells used in implementing modules of a circuit design. FIGS. 2-1 and 2-2 each show block diagrams of a programmable IC having 12 configuration memory frames, with frames numbered 1-8 being configured to implement modules A, B and C of a circuit design. Portions A1 and A2 of module A are implemented in frames 1 and 2, respectively, portions B1 and B2 of module B are implemented in frames 3 and 4, respectively, and portions C1-C4 of module C are implemented in frames 5-8, respectively. In the configuration shown in FIGS. 2-1, all of the configuration memory frames are repeatedly checked in a sequential order from 1-12. In this configuration, each configuration memory frame is checked for corruption once every twelve time slots, where a time slot is the time required to check one frame for corruption.

FIGS. 2-2 shows groups of memory cells used in implementing modules of a circuit design and associated priorities for checking for corruption of those memory cells. In this example, module A is assigned a high priority, module B is assigned a medium priority, and module C is assigned a low priority. At the module level, corruption checking is scheduled in the order: module A, module B, module A, module C, repeat. Using this example scheduling algorithm, 16 time slots are required to check all frames used to implement the circuit design. One complete cycle checks frames in the order:

1-3-2-5-1-4-2-6-1-3-2-7-1-4-2-8.

This corresponds to checking the portions of the implemented modules in the order:

A1→B1→A2→C1→A1→B2→A2→C2→A1→B1→A2→C3→A1→B2→A2→C4.

The frames are labeled with the time slots in which the frames are checked. In this order, each frame used to implement module A is checked for corruption once every 4 time slots, each frame used to implement module B is checked for corruption once every 8 time slots, and each frame used to implement module C is checked for corruption once every 16 time slots.

As a comparative example, if frame 1, in which portion A1 of module A is implemented, becomes corrupted immediately after frame 1 is checked, corruption of the frame will not be detected by the approach illustrated in FIGS. 2-1 for 12 time slots. In contrast, corruption will be detected using the approach shown FIGS. 2-2 in only 4 time slots. In this manner, by prioritizing critical modules, recovery time following corruption of memory may be reduced.

In this illustrative example, three priority levels are used for scheduling configuration memory locations for corruption checking. Memory frames of a module are scheduled based on the priority of module and the number of memory cells in the module in order to check memory frames of higher priority modules at a higher frequency than memory frames of lower priority modules. For example, although one frame of each of modules B and C is checked in 1 of every 4 time slots, collectively the frames in which module B is implemented are checked twice as often as the frames in which module C is implemented because B is implemented in one-half as many memory frames as module C. However, it is recognized that the scheduling algorithm may employ any number of priority levels and schedule checking of frames, according to a number of factors including the number of frames used to implement a module, the number of frames shared between modules, etc. This may ensure that frames of higher priority modules are checked at a greater frequency than frames of lower priority modules.

The examples and embodiments are primarily described with reference to a programmable IC having a single corruption detection circuit that checks for corruption of memory frames in a time division multiplexed manner according to priorities of the modules that are implemented in the memory frames. However, it is recognized that a plurality of corruption detection circuits may be used to respectively check for corruption of different memory locations in parallel. In such embodiments, configuration memory locations may be scheduled for corruption checks by the plurality of corruption detection circuits using various scheduling algorithms similar to those used to schedule processes for execution in multi-core processing systems.

In one or more embodiments, a high priority or critical module may be implemented with double modular redundancy (DMR) and prioritized corruption detection. With DMR, two copies of a circuit are implemented, and the outputs from the two copies are compared for discrepancy. If the outputs differ, prioritized corruption detection, as described above, is used to determine which copy is implemented with corrupted memory. Once the source of the discrepancy is determined, the output of the uncorrupted module may then be selected as the output value and operation of the circuit may continue. Because only two redundant copies are required to be implemented for double modular redundancy, continuous operation may be achieved at a low hardware cost compared to that required for TMR.

Corruption checking is prioritized to scan more frequently configuration memory frames that implement one or both of the redundant copies than configuration memory cells that implement one or more other modules of the circuit design. Because memory cells of the DMR-implemented module are scanned more frequently, less time will pass before correct output can be determined, in comparison to non-prioritized corruption detection. In this manner, response time of a DMR system may be reduced for critical systems.

Figure 3:
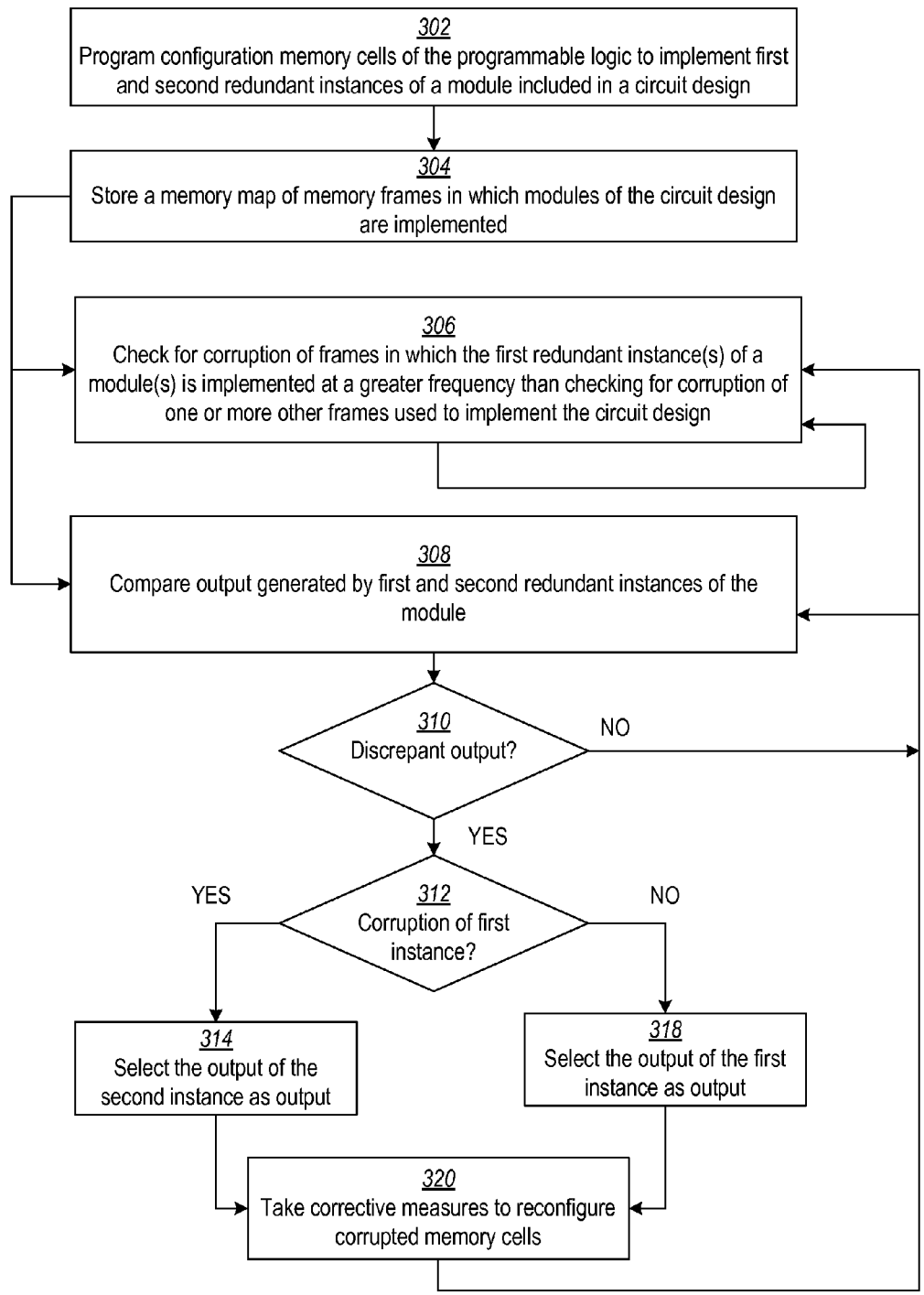
FIG. 3 shows a method of prioritized checking for corruption in a system having double modular redundant modules.

FIG. 3 illustrates a flow diagram of a process of using prioritized corruption checking in detecting and mitigating upsets of a DMR-implemented circuit in programmable logic. Configuration memory cells of the programmable logic are configured to implement a first redundant instance and a second redundant instance of one or more modules of a circuit design at step 302. A memory map, which indicates frames of the configuration memory used to implement the modules of the circuit design, is stored at block 304. As described above, the memory map may be stored in volatile or non-volatile memory, and may be stored either in internal memory of the programmable logic integrated circuit or external memory that is accessible by the programmable logic.

During operation of the circuit, memory frames used to implement modules of the circuit are repeatedly checked for corruption at block 306. Configuration frames used to implement a first redundant instance of a module are checked for corruption with a greater frequency than one or more other configuration frames used to implement the circuit design. In one embodiment, for example, the configuration frames that implement the first redundant instance are checked repeatedly, and the configuration frames that implement the second redundant instance are checked less frequently or not checked at all. If corruption is detected in the first instance, the system may enter a failover mode of operation in which output from the second instance is selected. After the corrupt first instance has been repaired, the system can return to selecting output from the first instance and checking for corruption therein. The chances of the configuration memory frames of the second instance becoming corrupt while the first instance is being repaired is believed to be negligible. The checking for corruption at block 306 is an ongoing process that continues in parallel with the processing of blocks 308-320.

Concurrent with the repeated checking for corruption of memory cells, outputs generated by the first and second redundant instances of the module are compared at block 308. If a discrepancy exists in the compared outputs, the process determines which redundant instance of the module corresponds to the upset configuration memory cell at block 312 using the results of the corruption checks performed at block 306. The output of the non-faulty instance is selected at blocks 314 and 318.

In one or more embodiments, corruption detected at block 306 may be logged so the process may immediately respond to a subsequent discrepancy detected at decision block 310. In response to discrepant output, the system determines if corruption had been detected in the last scan of configuration memory of the first instance of the module. If corruption has been detected in the first instance of the module, the selection circuit may immediately proceed with selection of the output from the second instance of the module.

If corruption had not been detected in the last check of the configuration frame, the selection performed at blocks 314 and 318 is delayed until the configuration memory of the first instance is checked to determine whether the discrepancy originated with the first or the second copies of the module at decision block 312.

As described above, existing systems iteratively scan memory frames of the entire design sequentially. In such systems, a certain delay will be incurred between successive scans of a frame. In this delay period, corruption will not be detected until the next scan. When discrepant output is detected between scans of memory frames in which the instances are implemented, the system would be unable to determine which redundant instance of the module is corrupt until the frames are scanned again. This delay can disrupt continuous operation of the circuit. By prioritizing corruption detection of configuration memory, as shown in FIG. 3, the delay between successive corruption checks is shortened and, thus, time needed to determine and select the correct output can be reduced.

Corrective measures are taken at block 320 to correct the corrupted memory. Different corrective measures may be taken in response to detecting corruption according to application requirements. For example, in response to detecting corruption, an alarm condition may be signaled, a soft reset of the corrupted portion of configuration memory may be initiated, a non-corrupted redundant module may be selected as the source of future output until the corruption can be corrected, data indicative of the corruption and the associated module may be logged, etc.

Figure 4:
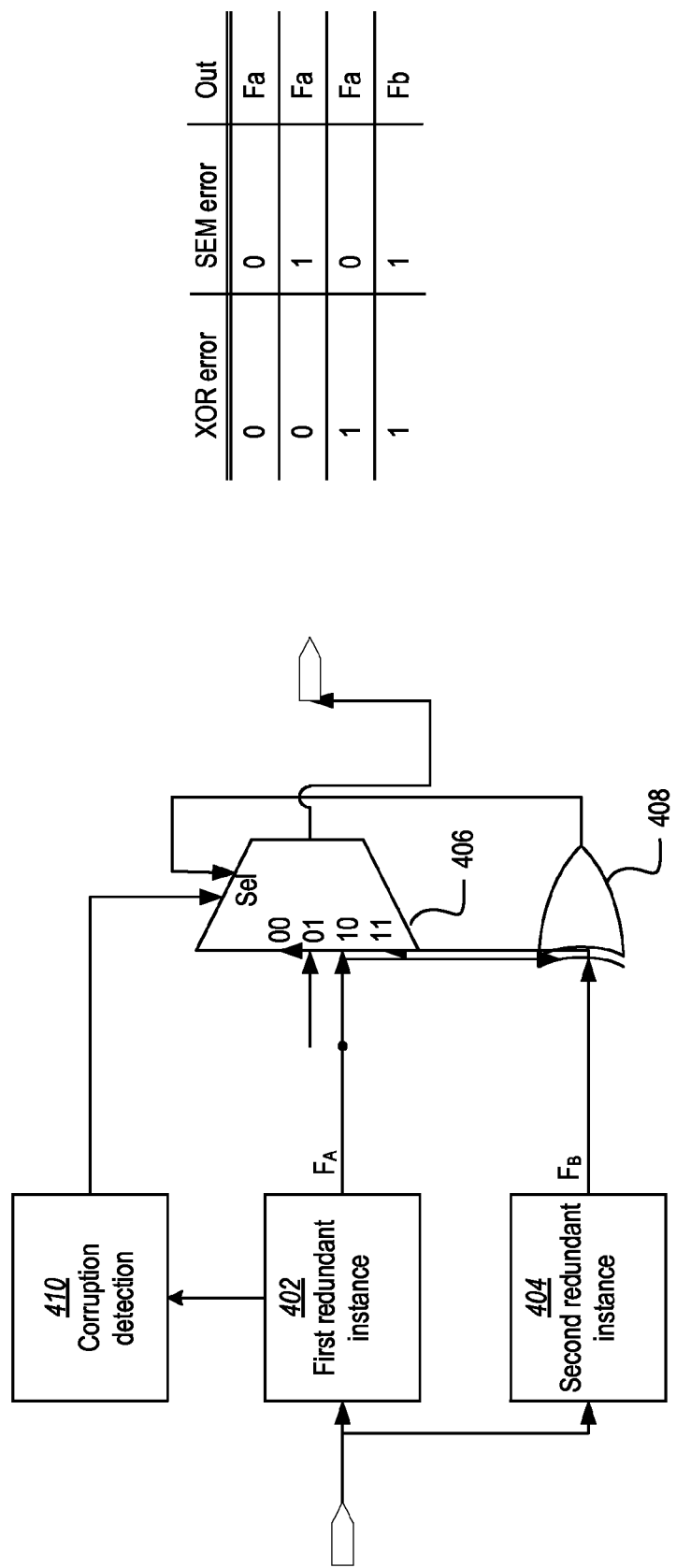
FIG. 4 shows an example circuit for implementing double modular redundancy, consistent with the method shown in FIG. 3.

FIG. 4 is a block diagram of an example circuit for detecting and responding to corruption of configuration memory in accordance with one or more embodiments. In this example, two redundant instances 402 and 404 of a high priority module of a circuit design are implemented in programmable logic using one or more programmable logic blocks to implement each redundant instance. The two redundant instances are coupled to a comparator circuit 408 and an output selection circuit 406 to select between the outputs generated by the two instances. Corruption detection circuit 410 schedules continuous scans of configuration memory to detect corruption, with different memory locations being scanned at different frequencies depending on the priority of the corresponding modules as described with reference to block 306 in FIG. 3. As described with reference to FIG. 3, the corruption detection circuit 410 scans configuration memory of at least one of the instances (402 and 404) of the high priority module at a greater frequency than one or more other modules of the circuit design. In this example, the corruption detection circuit 410 only scans module instance 402 for corruption. Corruption of instance 404 can be inferred when there is discrepancy between outputs $F_A$ and $F_B$ and no corruption is detected in instance 402. One or more other embodiments may implement corruption detection circuit 410 to check instance 404 for corruption as well.

The comparator circuit 408 compares the outputs of the two redundant circuits 402 and 404. If no discrepancy exists in the compared outputs, the selection circuit 406 may select the output of either of the redundant circuits. When no discrepancy is detected by the comparison circuit 408, logic "0" is input as the least significant selection bit of selection circuit 406, which directs the selection circuit to select output $F_A$ of the first module 402, which is input to inputs 00 and 10 of the selection circuit. If a discrepancy is detected, the comparison circuit 408 inputs logic "1" as the least significant selection bit, which directs the selection circuit 406 to select between output signals $F_A$ and $F_B$ (i.e., inputs 01 and 11) based on the most significant selection bit, which is controlled by corruption detection circuit 410. If the first instance of the module is determined to be corrupt, logic "1" is input as the most significant selection bit, and the $F_B$ input (input 11) is selected. If the first instance of the module is not determined to be corrupt, logic "0" is input as the most significant selection bit, and the $F_A$ input (input 01) is selected.

Figure 5:
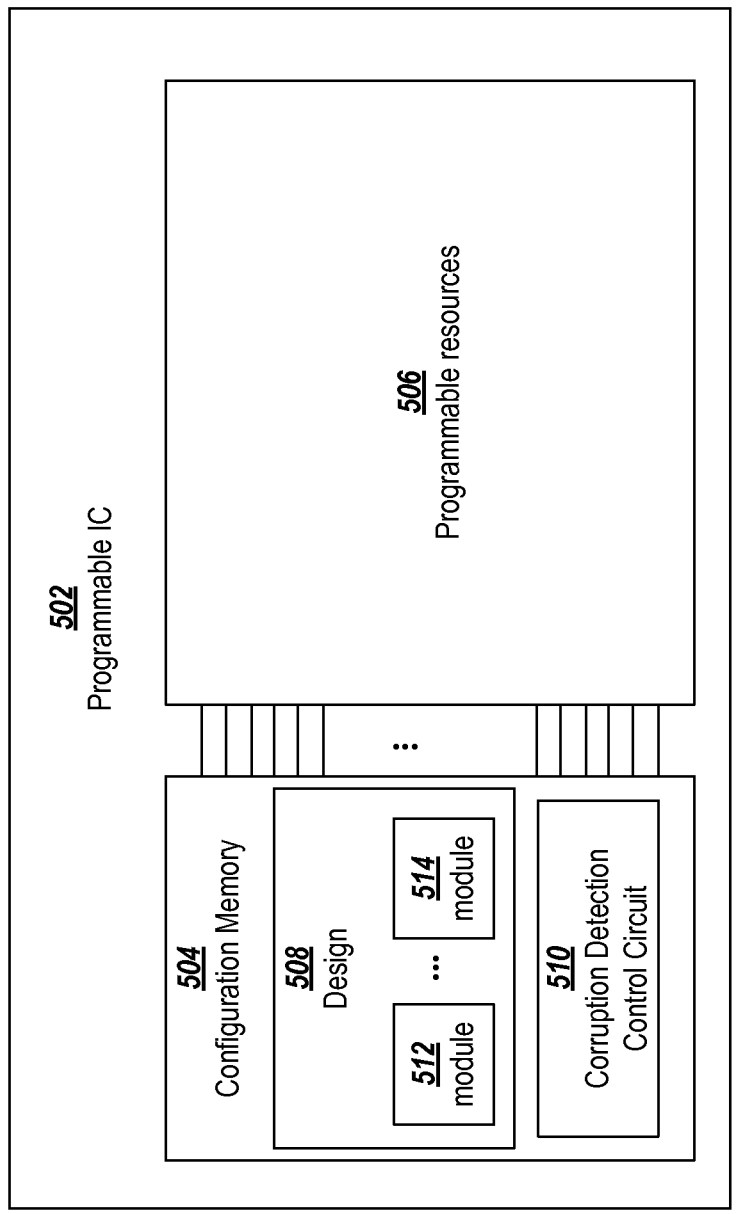
FIG. 5 is a block diagram of a programmable integrated circuit that is configured to perform prioritized checking for corruption.

FIG. 5 is a block diagram of an example programmable IC 502 that is configured to implement prioritized corruption checking. The programmable IC 502 includes a configuration memory 504 and a plurality of programmable resources 506. The data values stored in the configuration memory 504 control the functions implemented by the programmable resources.

The configuration memory 504 is configured with data that implement a design 508 and a corruption detection control circuit 510. The design 508 is an end-users's circuit design, for example, and includes multiple modules, which are shown as modules 512 through 514. Each of the modules 512-514 occupies a different area of configuration memory 504. The corruption detection control circuit 510 is configured to determine the portions of the configuration memory that are used to implement the different modules 512-514 of the circuit design. As described above, the control circuit 510 is configured to determine priority of the different modules and check the corresponding portions of the configuration memory for corruption at different rates based on the priorities of the modules. For example, the control circuit 510 may check the memory cells of modules 512 and 514 at different frequencies.

Figure 6:
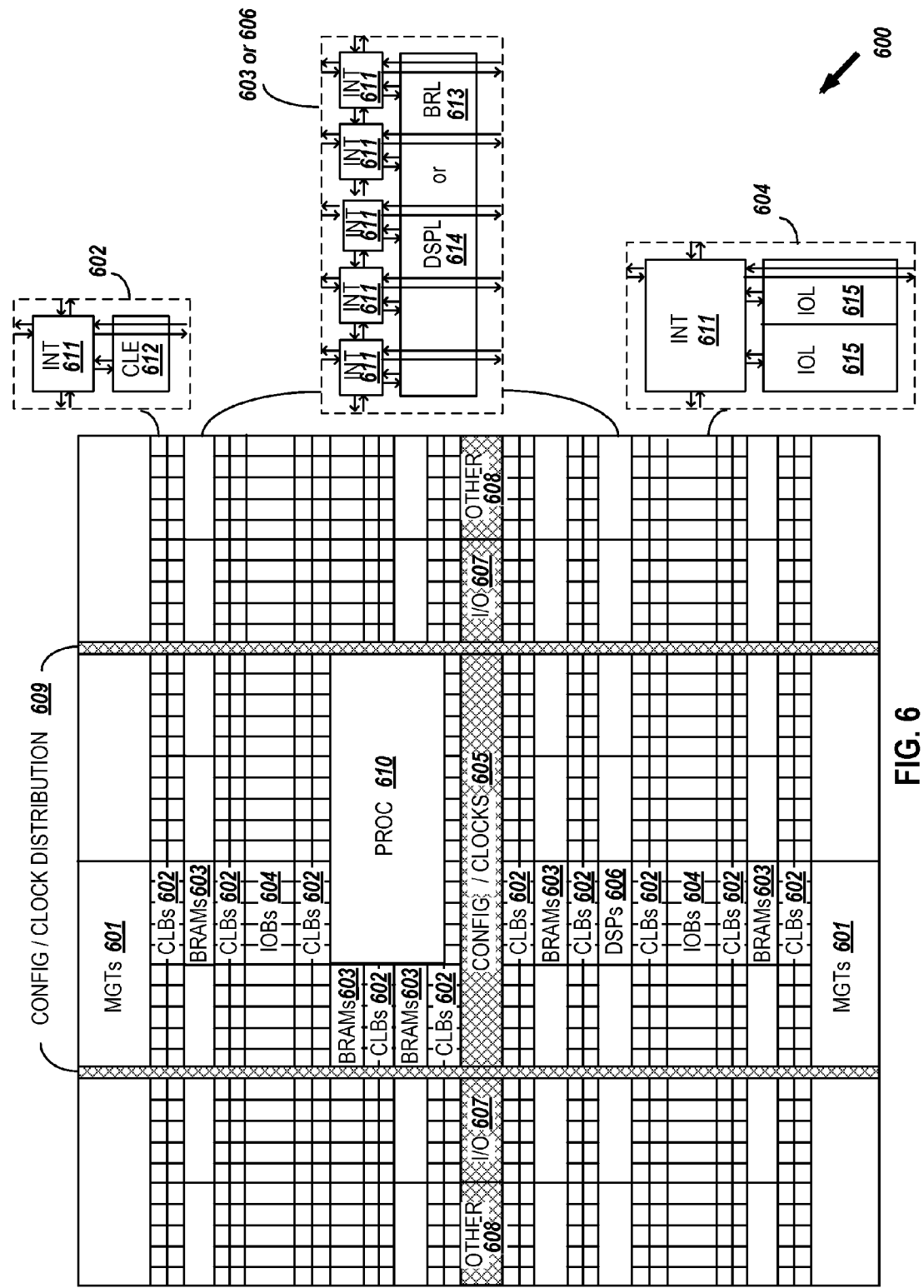
FIG. 6 is a block diagram of an example field programmable gate array that may be configured to perform prioritized checking for corruption.

FIG. 6 is a diagram of an example programmable integrated circuit that may be configured to implementing prioritized corruption checking and mitigation in accordance with one or more embodiments. Corruption detection, as previously described, may be implemented on the programmable logic and interconnect resources of programmable integrated circuit.

The programmable IC in this example is a field programmable gate array (FPGA). FPGAs can include several different types of programmable logic blocks in the array. For example, FIG. 6 illustrates an FPGA architecture (600) that includes a large number of different programmable tiles, including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, clock ports, and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An 10B 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments.

Figure 7:
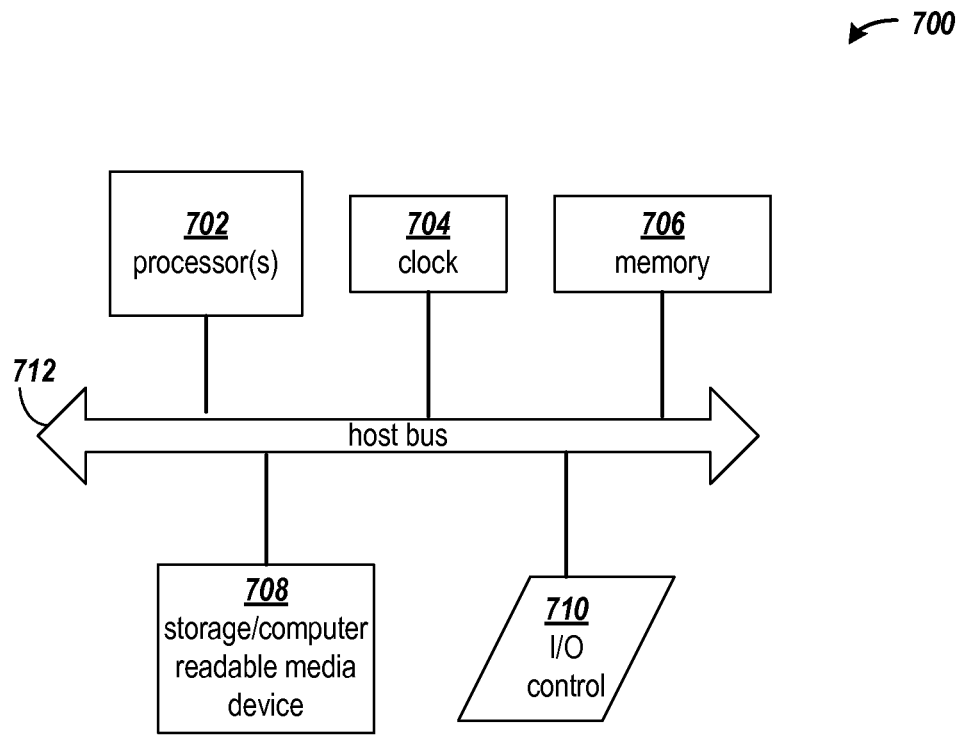
FIG. 7 is a block diagram of an example computing arrangement.

FIG. 7 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments. The computer code, comprising the processes encoded in a processor executable format, may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory unit 706, a storage unit 708, and an input/output control unit 710 coupled to host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory and a main memory. The storage arrangement 708 may include local and/or remote persistent storage, such as provided by magnetic disks (not shown), flash, EPROM, or other non-volatile data storage. The storage unit may be read or read/write capable. Further, the memory 706 and storage 708 may be combined in a single arrangement.

The processor arrangement 702 executes the software in storage 708 and/or memory 706 arrangements, reads data from and stores data to the storage 708 and/or memory 706 arrangements, and communicates with external devices through the input/output control arrangement 710. These functions are synchronized by the clock signal generator 704. The resource of the computing arrangement may be managed by either an operating system (not shown), or a hardware control unit (not shown).

The embodiments are thought to be applicable to detection and mitigation corrupted memory in a variety of systems. Other aspects and embodiments will be apparent to those skilled in the art from consideration of the specification. It is intended that the specification and illustrated embodiments be considered as examples only, with a true scope of the embodiments being indicated by the following claims.

What is claimed is:

1. A method of detecting corruption of configuration memory, comprising:
generating a bitstream of a circuit design that includes at least a first module and a second module;
determining configuration memory cells used to implement each of the first and second modules;
programming the configuration memory cells with the bitstream; and
after programming the configuration memory cells, checking for corruption, wherein the checking includes:
checking the configuration memory cells used to implement the first module for corruption at a first frequency; and
checking the configuration memory cells used to implement the second module for corruption at a second frequency, the first frequency being different from the second frequency.

2. The method of claim 1, further comprising:
setting corresponding priorities of each of the first and second modules of the circuit design; and
scheduling configuration memory cells of the first and second modules for corruption checking according to the corresponding priorities of the modules.

3. The method of claim 2, wherein setting the corresponding priorities includes:

determining a respective probability of failure for each of the first and second modules; and setting the corresponding priorities of the first and second modules according to the respective probabilities of failure.

4. The method of claim 2, wherein setting the respective priority of each of the first and second modules includes:

setting the corresponding priority of each of the first and second modules according to activity levels of the first and second modules.

5. The method of claim 2, further comprising, for each of the first and second modules, adjusting the corresponding priority of the module in response to the module switching between active and inactive states.

6. The method of claim 2, further comprising:

determining respective numbers of configuration memory cells used to implement each of the first and second modules of the circuit design; and wherein configuration memory cells of the first and second modules are scheduled for corruption checking according to the corresponding priority of the module and the numbers of configuration memory cells used to implement the modules.

7. The method of claim 1, wherein the checking for corruption of the configuration memory cells used to implement one of the first or second modules includes:

calculating an error code from bit values of a plurality of the configuration memory cells of the one of the first or second modules;

retrieving from a memory, an expected error code associated with the plurality of configuration memory cells of the one of the first or second modules; and checking for a discrepancy between the calculated and expected error codes.

8. The method of claim 1, wherein:

the checking of the configuration memory cells used to implement the first module for corruption includes checking the configuration memory cells used to implement the first module for corruption using a first error detection circuit; and the checking the configuration memory cells used to implement the second module for corruption includes checking the configuration memory cells used to implement the second module for corruption using a second error detection circuit.

9. The method of claim 1, wherein:

the checking of the configuration memory cells used to implement the first module for corruption and the checking of the configuration memory cells used to implement the second module for corruption includes checking the configuration memory cells used to implement the first and second modules for corruption using a single error detection circuit.

10. The method of claim 9, further comprising scheduling configuration memory cells of the first and second modules for corruption checking using the error detection circuit according to a scheduling algorithm that schedules checking of configuration memory cells in a time division multiplexed manner with time slots allotted according to a corresponding priorities of the first and second modules.

11. A circuit, comprising:

a plurality of memory cells configured to implement a plurality of modules of a circuit design; and a control circuit coupled to the plurality of memory cells and configured to:

determine configuration memory cells used to implement each of first and second modules of the plurality of modules;

check the configuration memory cells used to implement the first module for corruption at a first frequency; and check the configuration memory cells used to implement the second module for corruption at a second frequency, the first frequency being different from the second frequency.

12. The circuit of claim 11, wherein the control circuit is further configured to:

determine a priority of each of the first and second modules of the plurality of modules; and schedule configuration memory cells of the first and second modules for corruption checking as a function of the corresponding priorities of the modules.

13. The circuit of claim 11, wherein the control circuit is further configured to:

determine a respective probability of failure for each of the first and second modules; and set the corresponding priorities of the first and second modules according to the respective probabilities of failure.

14. A method of mitigating corruption of configuration memory cells, comprising:

programming configuration memory cells to implement one or more modules of a circuit design in respective pairs of first and second redundant instances;

determining configuration memory cells used to implement the first redundant instance of each of the one or more modules; and after programming the configuration memory cells:

for each of the one or more modules, checking configuration memory cells programmed with the first redundant instance for corruption at a first frequency;

for each module of the circuit design other than the one or more modules, checking configuration memory cells used to implement the module for corruption at a second frequency, the first frequency being greater than the second frequency;

for each of the one or more modules, comparing outputs of the first and second redundant instances that implement the module; and in response to discrepant outputs between the first and second redundant instances that implement a module of the one or more modules, determining whether the configuration memory cells programmed with the first redundant instance or the configuration memory cells programmed with the second redundant instance has a corrupted configuration memory cell, and selecting output from the one of the first and second redundant instances for which the programmed configuration memory cells do not include a corrupted configuration memory cell.

15. The method of claim 14, wherein the determining of whether the configuration memory cells programmed with the first redundant instance or the configuration memory cells programmed with the second redundant instance has a corrupted configuration memory cell, includes determining if corruption has been detected in a previous check of the configuration memory cells used to implement the first redundant instance.

16. The method of claim 14, further comprising:

setting a corresponding priority of each module of the circuit design; and scheduling configuration memory cells of the modules for corruption checking according to the corresponding priority of each module.

17. The method of claim 16, wherein setting the priority each module includes:
  determining a respective probability of failure for the module; and
  setting the priority of the module according to the respective probability of failure.

18. The method of claim 16, wherein setting the priority of each module includes:
  setting the priority of each of the first and second modules according to activity levels of the first and second modules.

19. The method of claim 16, further comprising, for at least one module of the circuit design, adjusting the corresponding priority of the at least one module in response to the module switching between active and inactive states.

20. The method of claim 16, further comprising:
  determining a respective number of configuration memory cells used to implement each module of the circuit design; and
  wherein configuration memory cells of each module are scheduled for corruption checking according to the corresponding priority of the module and the respective number of configuration memory cells used to implement the module.

* * * * *